US009384450B1

(12) United States Patent  
Cordes et al.

(10) Patent No.: US 9,384,450 B1  
(45) Date of Patent: Jul. 5, 2016

(54) TRAINING MACHINE LEARNING MODELS FOR OPEN-DOMAIN QUESTION ANSWERING SYSTEM

(71) Applicant: INTERNATIONAL BUSINESS MACHINES CORPORATION, Armonk, NY (US)

(72) Inventors: Michael Cordes, Somers, NY (US); Tolga Oral, Cambridge, MA (US); David Osofsky, Cambridge, MA (US); Di Wang, Cambridge, MA (US); Sara Weber, Cambridge, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 14 days.

(21) Appl. No.: 14/603,019

(22) Filed: Jan. 22, 2015

(51) Int. Cl.  
*G06N 99/00* (2010.01)

(52) U.S. Cl.  
CPC .................................... *G06N 99/005* (2013.01)

(58) Field of Classification Search  
CPC ..................................................... G06N 99/005  
USPC ............................................................ 706/11  
See application file for complete search history.

(56) References Cited

U.S. PATENT DOCUMENTS

| | | | | |
|---|---|---|---|---|
| 2007/0067293 | A1* | 3/2007 | Yu | G06F 17/30687 |
| 2011/0191270 | A1 | 8/2011 | Peng et al. | |
| 2012/0077178 | A1* | 3/2012 | Bagchi | G09B 7/00 434/362 |
| 2013/0029307 | A1* | 1/2013 | Ni | G06N 99/005 434/322 |
| 2013/0132308 | A1* | 5/2013 | Boss | G06F 17/30976 706/12 |
| 2014/0127647 | A1* | 5/2014 | Petri | G06N 99/005 434/118 |
| 2014/0129492 | A1 | 5/2014 | Petri et al. | |
| 2014/0172878 | A1* | 6/2014 | Clark | G06F 17/3053 707/748 |
| 2014/0172882 | A1* | 6/2014 | Clark | G06F 17/30038 707/749 |
| 2014/0272909 | A1* | 9/2014 | Isensee | G09B 7/02 434/362 |
| 2015/0235131 | A1* | 8/2015 | Allen | G06F 17/30654 706/48 |

OTHER PUBLICATIONS

Luo, Y. et al., "A Study on Expert Sourcing Enterprise Question Collection and Classification", LREC, 2014.*  
Aaron K. Baughman, et al., "Deepqa Jeopardy! Gamification: A Machine-Learning Perspective," IEEE Transactions on Computational Intelligence and AI in Games, vol. 6, No. 1, Mar. 2014, pp. 55-66.  
"Using Weighted Modifiers to Tune a Machine Learning Model," IPCOM000227940D, May 29, 2013, pp. 1-3.

* cited by examiner

*Primary Examiner* — Stanley K Hill  
*Assistant Examiner* — Dave Misir  
(74) *Attorney, Agent, or Firm* — F. Chau & Associates, LLC (57) ABSTRACT

A method for training a machine learning model for open domain question answering includes receiving trained classifiers for question answering. The received trained classifiers are used to generate a set of candidate answers to a question. Second trained classifiers are used for scoring each of the candidate answers. The scoring indicates a measure of how well each candidate answer answers the question. Using the second trained classifiers for scoring each of the candidate answers includes comparing each candidate answer to a first ground truth corresponding to the question. A set of top-scoring candidate answers is presented to a human operator who marks each as correct or incorrect. The correct candidate answers are treated as additional ground truths for further training the first trained classifiers.

20 Claims, 8 Drawing Sheets

TRAINING MACHINE LEARNING MODELS FOR OPEN-DOMAIN QUESTION ANSWERING SYSTEM

TECHNICAL FIELD

The present disclosure relates to machine learning and, more specifically, to systems and methods for training machine learning models for open-domain question answering system.

DISCUSSION OF THE RELATED ART

Automated systems for answering natural-language questions spanning a wide range of topics have been developed. These systems may be called open-domain question answering systems. Open-domain question answering systems may be able to provide answers to questions posed by one or more users in a manner similar to how one person may answer a question posed by another person. These systems may either be manually programmed to dissect and interpret a question provided so that the question may be matched to a question/answer set that is stored within a database or machine learning may be used to train the system to provide an answer for a question.

Machine learning, in this context, may include a user providing training data comprising question/answer sets, which may be referred to herein as ground truths. However, this approach may not be particularly effective when the person asking the question is not bound to a particular syntax or manner of asking the question. In these cases, there may be a seemingly unlimited ways in which a particular question may be asked and a machine learning algorithm may not be able to satisfactorily learn how to answer a given question when the questions of the training data exhibit few similarities with the given question being asked.

Accordingly, exemplary embodiments of the present invention may provide various approaches for training machine learning models for open-domain question answering.

SUMMARY

A method for training a machine learning model for open domain question answering includes receiving one or more first trained classifiers for question answering. The received one or more trained classifiers are used to generate a set of candidate answers to a question. One or more second trained classifiers are used for scoring each of the candidate answers. The scoring indicates a measure of how well each candidate answer answers the question. Using the second trained classifiers for scoring each of the candidate answers includes comparing each candidate answer to a first ground truth corresponding to the question. A set of top-scoring candidate answers is presented to a human operator. An indication from the human operator as to whether each presented candidate answer is a correct answer for the question or an incorrect answer is received for the question. The candidate answers indicated as correct by the human operator are treated as an additional ground truth for the question. The additional ground truth for the question is used to further train the first trained classifiers.

The received one or more first trained classifiers may be trained using machine learning. The received one or more first trained classifiers may be trained using the question and the first ground truth as training data. The question and the first ground truth may be provided to the human operator when presenting the set of top-scoring candidate answers. The one or more second trained classifiers may be trained using machine learning.

The method may further include treating the candidate answers indicated as correct by the human operator as an additional ground truth for the question and using the additional ground truth for the question to further train the second trained classifiers.

Generating the set of candidate answers to the question may include generating features for the candidate answers and the generated features may be used by the second trained classifiers in scoring each of the candidate answers.

A method for training a machine learning model for open domain question answering includes receiving one or more first trained classifiers for question answering. The received one or more trained classifiers are used to generate a set of candidate answers to a question. One or more second trained classifiers are used for scoring each of the candidate answers. The scoring indicates a measure of how well each candidate answer answers the question. Using the second trained classifiers for scoring each of the candidate answers includes comparing each candidate answer to a first ground truth corresponding to the question. A set of top-scoring answers is designated as a correct answer for the question. The candidate answers designated as correct are treated as additional ground truths for the question. The additional ground truths for the question are used to further train the first trained classifiers.

The candidate answers designated as correct may be treated as additional ground truths for the question for the purpose of further training the first trained classifiers on one occasion.

The candidate answers designated as correct may be added to a set of ground truths for the question along with the first ground truth for the question so that all subsequent further training of the first trained classifiers make use of the added ground truths.

The received one or more first trained classifiers may be trained using machine learning. The received one or more first trained classifiers may be trained using the question and the first ground truth as training data. The one or more second trained classifiers may be trained using machine learning.

The method may further include treating the candidate answers designated as correct as an additional ground truth for the question and using the additional ground truth for the question to further train the second trained classifiers.

Generating the set of candidate answers to the question includes generating features for the candidate answers and the generated features may be used by the second trained classifiers in scoring each of the candidate answers.

A method for training a machine learning model for open domain question answering includes receiving a set of questions and corresponding ground truth answers for each of the questions of the set of questions. A set of first trained classifiers for question answering is trained by machine learning using the set of questions and corresponding ground truth answers as training data. One of the received set of questions is selected and the first trained classifier is applied to the selected question to produce a set of candidate answers. The one or more second trained classifiers are used for scoring each of the candidate answers. The scoring indicates a measure of how well each candidate answer answers the selected question. Using the second trained classifiers for scoring each of the candidate answers includes comparing each candidate answer to a first ground truth, of the ground truth answers, that corresponds to the selected question. A set of candidate answers is designated as correct answers for the selected question based either on score alone or based on human annotations of a set of top-scoring candidate answers. The candidate answers designated as correct are treated as additional ground truths for the question. The additional ground truths for the question are used to further train the first trained classifiers.

The candidate answers designated as correct may be treated as additional ground truths for the question for the purpose of further training the first trained classifiers on one occasion.

The candidate answers designated as correct may be added to a set of ground truths for the question along with the first ground truth for the question so that all subsequent further training of the first trained classifiers make use of the added ground truths.

Human annotations may be obtained by presenting a set of top-scoring candidate answers to a human operator, and receiving an indication from the human operator as to whether each presented candidate answer is a correct answer for the question or an incorrect answer for the question.

Generating the set of candidate answers to the question may include generating features for the candidate answers and the generated features are used by the second trained classifiers in scoring each of the candidate answers.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention provide various approaches for training machine learning models to provide open-domain question answering. These approaches may begin with the receiving of ground truths from a human user. These ground truths may be question and answer pairs that may serve as training data for the machine learning models. After training has been performed, or trained classifiers are otherwise provided, the trained classifiers may be honed by selecting a question and answer pair, either one taken from among the original training data or taking a new question and answer pair. The question from this pair may be used by the trained classifiers to generate a set of candidate answers. This set may be relatively large and may include tens, hundreds, thousands or more candidate answers.

Candidate answers may then be deemed correct or incorrect based on a strict matching between candidate answers and ground truths. Strict matching may compare each candidate answer, character-by-character, against the ground truths.

Where strict matching is not effective, for example, as may be the case for answering open-domain questions, the set of candidate answers may be filtered and a human user may be tasked with examining the set of filtered candidate answers to determine which candidate answers are correct and which are incorrect so that these determinations may be used to refine the training data, for example, by adding the true candidate answers to the set of ground truths so that subsequent training may lead to stronger classifiers.

However, this task of characterizing candidate answers as correct or incorrect may be very labor intensive and the step of filtering candidate answer results may serve to inadvertently remove correct candidate answers. Exemplary embodiments of the present invention provide approaches for partially or fully automating this determination using an additional level of machine learning so that the trained classifiers which produce the candidate answers may be effectively refined with minimal or no human intervention.

According to exemplary embodiments of the present invention, the set of candidate answers generated by the trained classifiers need not be filtered and thus the entire set of candidate answers may be used. Each candidate answer may then be assigned a score based on any number of scoring techniques. Examples of scoring techniques may include rule-based algorithms such as strict string matching and regular expression matching, although the invention is not limited to these approaches and it is contemplated that various other techniques may be used. Indeed, exemplary embodiments of the present invention may utilize semantic analysis and machine learning, rather than strict matching, to match the meaning of candidate answers to ground truths. For example, a second set of trained classifiers may be used, to automatically, or partially-automatically, determine which of the candidate answers are correct and which are incorrect. Those candidate answers deemed to be correct may then be added to the set of ground truths so that subsequent machine learning may produce more accurate classifiers.

Regardless of the approach used to score each candidate answer, the assigned score may be an indicator of a likelihood that the candidate answer is a correct answer for the question posed.

From here, exemplary embodiments may either operate in an assisted mode or an unassisted mode. In the assisted mode, a top-ranked set of candidate answers may be provided to a human user. The user may also receive the question and answer pair, the question of which might have been used by the original trained classifiers to produce the candidate answers. The user may select, from among the set of top-ranked candidate answers, a best answer and/or the user may annotate the set of top-ranked candidate answers to demine which candidate answers are correct and which are not correct. Because the correct answers here are called ground truths, the user is tasked with matching the candidate answers to the ground truths. Therefore, as explained herein, the user is engaged in ground truth matching and the system and software used by the user to assist in ground truth matching may be referred to herein as a ground truth matcher (GTM) tool. The GTM tool may help the user to provide ground truth matching by intelligent ranking each candidate answer and then presenting, to the user, only a limited set of top-ranking candidate answers so that the user can perform GTM with greater efficiency. A machine learning model may be used to score each candidate answer. This machine learning model may utilize features that are generated with various natural language processing techniques.

The user annotation of the top-ranking candidate answers may then be used to refine the original trained classifiers so that they may be more robust to arbitrary questions posed thereafter.

Any number of question and answer pairs may be used in this fashion to refine the trained classifiers and according to one embodiment of the present invention; each of the question and answer pairs used to originally train the classifiers may be used.

Alternatively, exemplary embodiments of the present invention may operate in an unassisted mode in which a human user is not required to annotate candidate answers. According to one such unassisted mode approach, one or more of the top-ranked candidate answers may be presumed correct and incorporated into the original ground truth and used to reinforce the original trained classifiers. According to another unassisted mode approach, the one or more top-ranked candidate answers may be used as a run-time temporary ground truth to bolster the training algorithms. Regardless of the unassisted mode used, the process of using top-ranked candidate answers to bolster the training algorithm may be repeated for any number of question and answer sets. In this way, the training algorithms may be iteratively honed. According to some exemplary embodiments of the present invention, both of the aforementioned unassisted mode approaches may be combined, for example, one after the other.

According to other exemplary embodiments of the present invention, the assisted mode approach may be combined with one or both of the unassisted mode approaches so that the set of ground truths may be expanded and accordingly, the training algorithm may be enhanced for a given level of human candidate answer annotation.

The so-trained and honed classifiers may then be used to provide automated answers for open-domain questions, for example, in a telephone-based automated customer service or technical support environment.

Figure 1:
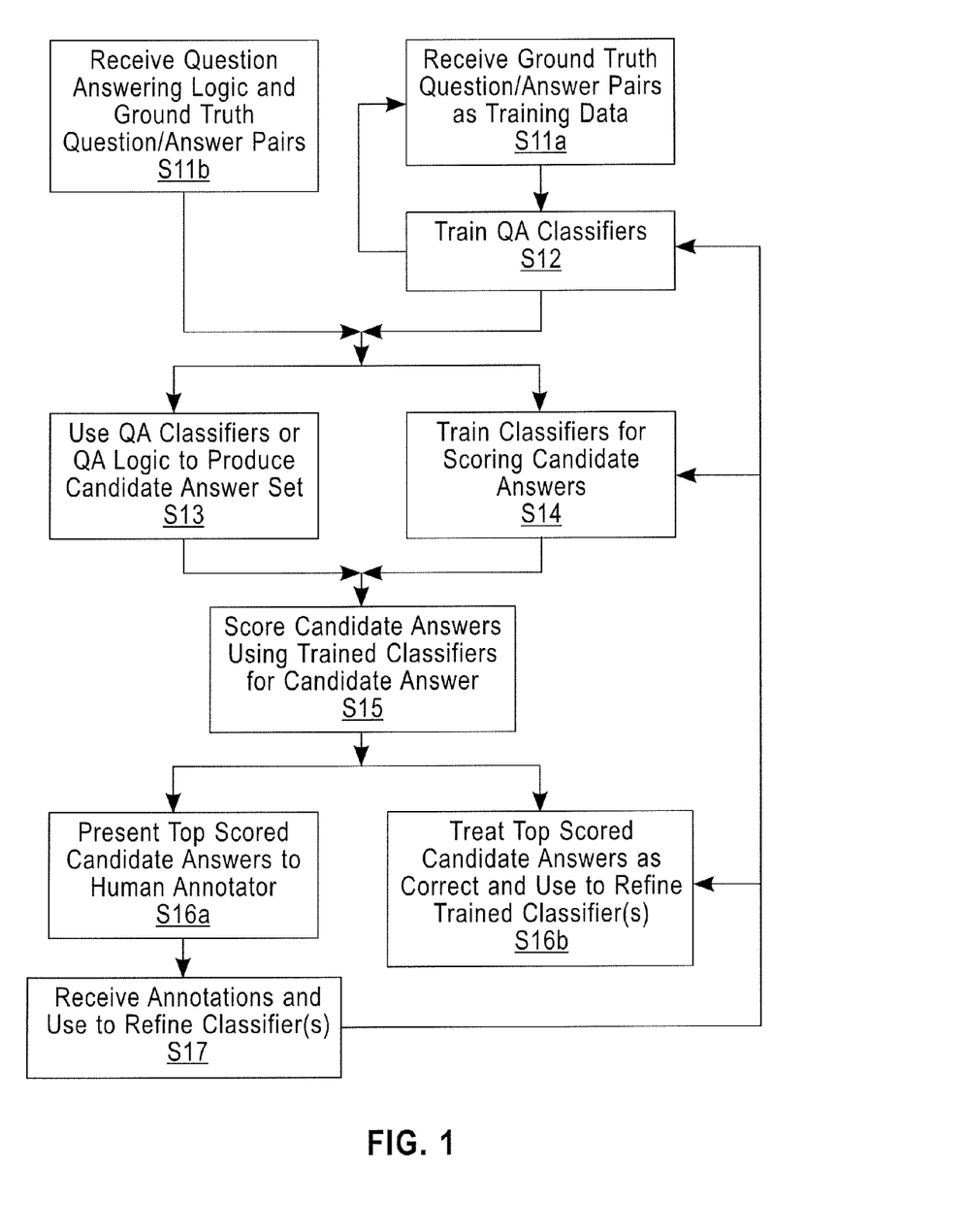
FIG. 1 is a flow chart illustrating an overview of various approaches for using machine learning to answer open-domain questions in accordance with exemplary embodiments of the present invention.

Exemplary embodiments of the present invention will be described below in greater detail with reference to the figures. FIG. 1 is a flow chart illustrating an overview of various approaches for using machine learning to answer open-domain questions in accordance with exemplary embodiments of the present invention. Two possible starts to the process will be described. In accordance with a first approach, ground truth question and answer pairs may be received as training data (Step S11a). Each question and answer pair may include one question, of the sort that the system for answering open-domain questions will be expected to answer, and one corresponding answer for the question. One or more classifiers may be trained using these question and answer pairs (Step S12). The process of training question-answer (QA) classifiers (Step S12) and receiving training data (Step S11a) may be repeated for as long as new training data is made available. In this way, classifiers for answering questions may be trained.

However, according to other approaches of exemplary embodiments of the present invention, logic for answering questions may simply be received along with ground truth question/answer pairs (Step S11b). According to this approach, the manner in which the logic is created is not of any concern. This logic may include one or more trained classifiers, as discussed above, or other approaches for artificial intelligence provision may be employed. These approaches may include machine learning techniques known in the art.

Regardless of whether classifiers were trained on the question/answer pairs or answering logic was received, in a next step, the trained classifiers or received answering logic may be used to produce a set of candidate answers from the questions of the question/answer pairs of the ground truth data (Step S13).

A set of one or more classifiers may also be trained for scoring each of the set of candidate answers (Step S14). This set of trained classifiers may be separate and apart from the trained classifiers that may be trained in Step S12 or otherwise provided in Step 11b. Thus, for the purposes of clearly distinguishing between these different sets of machine learning classifiers, the first set may be referred to herein as the "question answering classifiers" and the second set may be referred to herein as the "candidate answer scoring classifiers."

The step of training the candidate answer scoring classifiers (Step S14) may be replaced by a step of receiving candidate scoring logic in much the same way as the step of training question answering classifiers (Step S12) may be replaced by the step of receiving question answering logic (Step S11b).

As described above, the set of candidate answers may be large and this set of candidate answers need not be filtered. Each of the candidate answers may then be scored using the candidate answer scoring classifiers (Step S15). These scoring classifiers, according to some exemplary embodiments of the present invention, need not rely upon strict matching, although strict matching techniques may be used in a supportive way. The scoring classifiers may primarily use semantic analysis and machine learning to achieve matching by meaning between ground truth and candidate answers. According to one approach, a set of top-scoring candidate answers may be presented to a human annotator for review (Step S16a). It should be noted that there is a substantive difference between (a) filtering the set of candidate answers and presenting the filtered set of candidate answers to the annotator, and (b) scoring each of the candidate answers and sending a set of top-scoring candidate answers to the annotator. In approach (a), a single set of criteria (e.g. a rules-based algorithm) is used to include or exclude each candidate answer while in approach (b), a machine learning model is assigning a probability value to each candidate answer based on a computer-learning model. Thus, in approach (a), the candidate answers may generally be assigned a binary designation based on the syntactic form of the candidate answer or strict string matching, while in approach (b), each candidate answer may be assigned a real number value based on a computer-learning model.

In the approach where the top-scoring candidate answers are provided to the human annotator (Step S16a), it may follow that user annotations are received and these annotations are used to refine the question answering classifiers and/or refine the candidate answer scoring classifiers (Step S17). The user annotations may include an indication of which of the top-scoring candidate answers correctly matches the corresponding answer of the question/answer pair.

However, according to another approach, human involvement need not be utilized. For example, a set of top-scoring candidate answers may be taken as correct and then used to refine the question answering classifiers and/or refine the candidate answer scoring classifiers (Step S16b).

In either event, the question answering classifiers and/or refine the candidate answer scoring classifiers may be refined. This process may be repeated for multiple iterations as the question answering classifiers and/or the candidate answer scoring classifiers strengthen. Stronger candidate answer scoring classifiers may speed up and enhance the rate at which the question answering classifiers are strengthened and ultimately, the resulting enhanced question answering classifiers may be used as part of an open-domain answering system.

The flow chart of FIG. 1 explains both an "assisted mode" in which a human annotator is tasked with determining if the top-scoring candidate answers are correct and "unassisted modes" in which human annotation is not required. Exemplary embodiments of the present invention may combine assisted and unassisted modes. For example, unassisted modes may be used for a predetermined number of iterations so that when the assisted mode is used, the candidate answer scoring is more effective. Alternatively, the assisted mode may be used first so that when the unassisted modes are used, they serve to reinforce high-quality results, as the effectiveness of the unassisted modes may be substantially influenced by the initial quality of the candidate answer scoring classifiers. Thus, as the above-described process is repeated, different options may be selected at each stage.

As discussed above, ground truth matching, in accordance with exemplary embodiments of the present invention, may use the connection between the question and its ground truth as features. This may be done using a second step of machine learning directed to the classification of candidate answers, rather than by the question answering classifiers directly. This is because the process of question answering assumes that given a question, the answer is not known and correct answers are to be discovered. Therefore even in the training process, the ground truths are disregarded. The ground truths are only used to validate candidate answers and to help the proposed system learn what kind of candidate answers are correct.

In this regard, the GTM serves as a system to refine/improve the training data, for the question answering classifier to be better trained.

Figure 2:
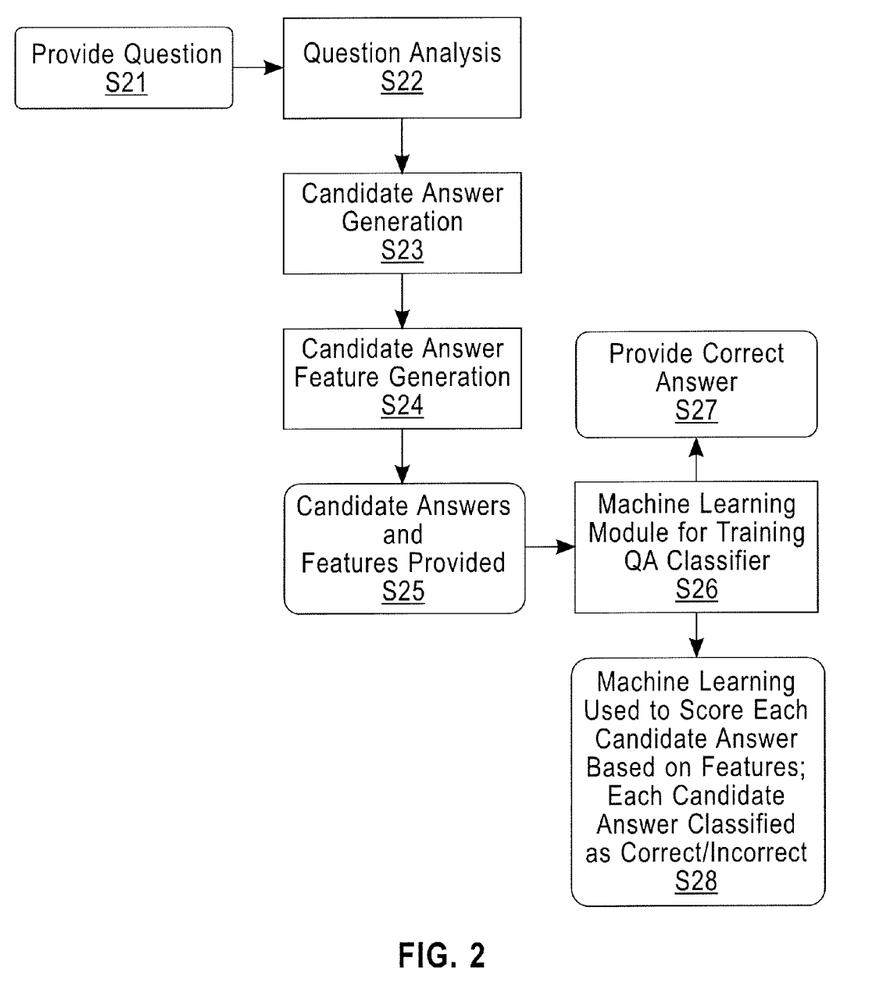
FIG. 2 is a flow chart illustrating an approach for machine learning question answering in accordance with exemplary embodiments of the present invention.

FIG. 2 is a flow chart illustrating an approach for machine learning question answering in accordance with exemplary embodiments of the present invention. First, a question is provided (Step S21). The question is then analyzed using question answering logic (Step S22) and a set of candidate answers is generated (Step S23). From there, features are generated from the candidate answers (Step S24). The features may include ways of characterizing and conceptualizing the candidate answers. The candidate answers and features may then be provided (Step S25) to a machine learning module for training the question answer classifier (Step S26). The trained question answering classifier may then be used to provide a correct answer (Step S27) and/or machine learning may be used to score each candidate answer based on the features, with each candidate answer being classified as either correct or incorrect (Step S28).

Figure 3:
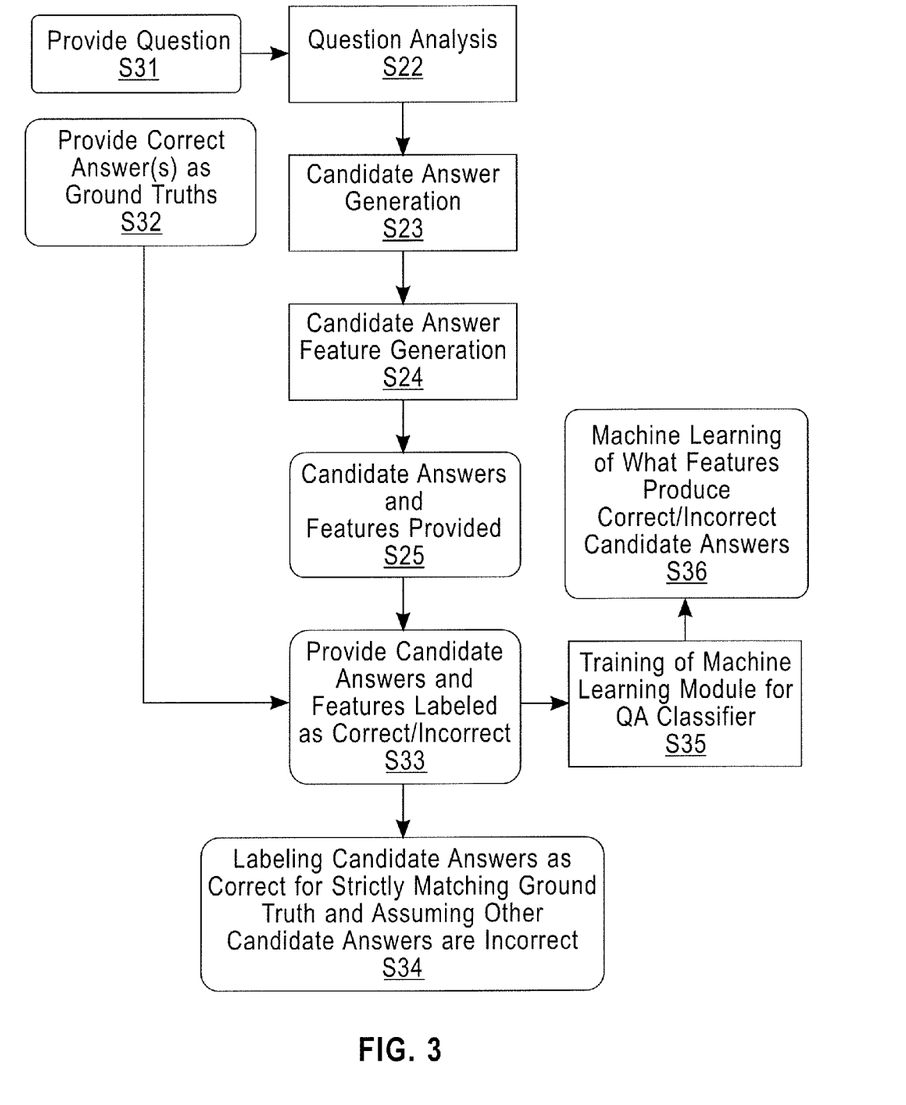
FIG. 3 is a flow chart illustrating an approach for machine learning question answering in accordance with exemplary embodiments of the present invention.

FIG. 3 is a flow chart illustrating an approach for machine learning question answering in accordance with exemplary embodiments of the present invention. Like reference numerals may designate similar or identical components to those discussed above with respect to FIG. 2 and accordingly, a description of these components is not repeated.

The set of questions from step S31 and the set of ground truths from step S32 may be associated but according to exemplary embodiments of the present invention, only the questions are provided initially (Step S31). The questions are analyzed (Step S22) and candidate answers are generated (Step S23). Features are generated from the candidate answers (Step S24) and these features are provided along with the candidate answers (Step S25) so that the candidate answers may be labeled as correct or incorrect (Step S33) based on the provided ground truths (Step S32). Here, candidate answers may be labeled as correct by strictly matching ground truths to find correct candidate answers and by assuming all candidate answers that cannot be strictly matched to ground truths are incorrect (Step S34).

Based on the labeling of step S33, the machine learning module for question answering classifiers may be trained (Step S35). Machine learning may be used to determine what features produce correct candidate answers and what features produce incorrect candidate answers (Step S36) so that the set of features generated from the candidate answers at step S24 may be enhanced.

Figure 4:
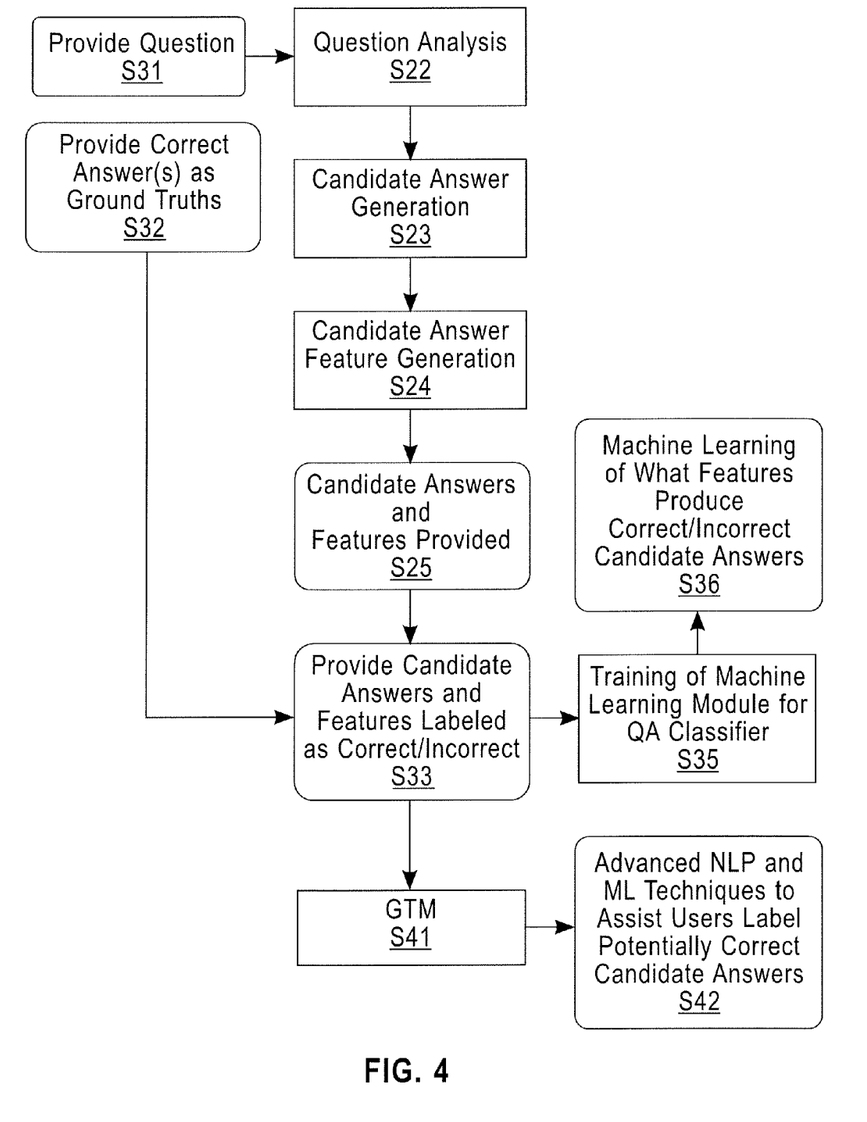
FIG. 4 is a flow chart illustrating an approach for machine learning question answering in accordance with exemplary embodiments of the present invention.

FIG. 4 is a flow chart illustrating an approach for machine learning question answering in accordance with exemplary embodiments of the present invention. Like reference numerals may designate similar or identical components to those discussed above with respect to FIGS. 2 and 3 and accordingly, a description of these components is not repeated.

According to this approach, ground truth matching (Step S41) may be used in labeling candidate answers as correct or incorrect. Here, natural language processing (NLP) and machine learning (ML) techniques may be used to assist users in the labeling of potentially correct candidate answers (Step S42).

Figure 5:
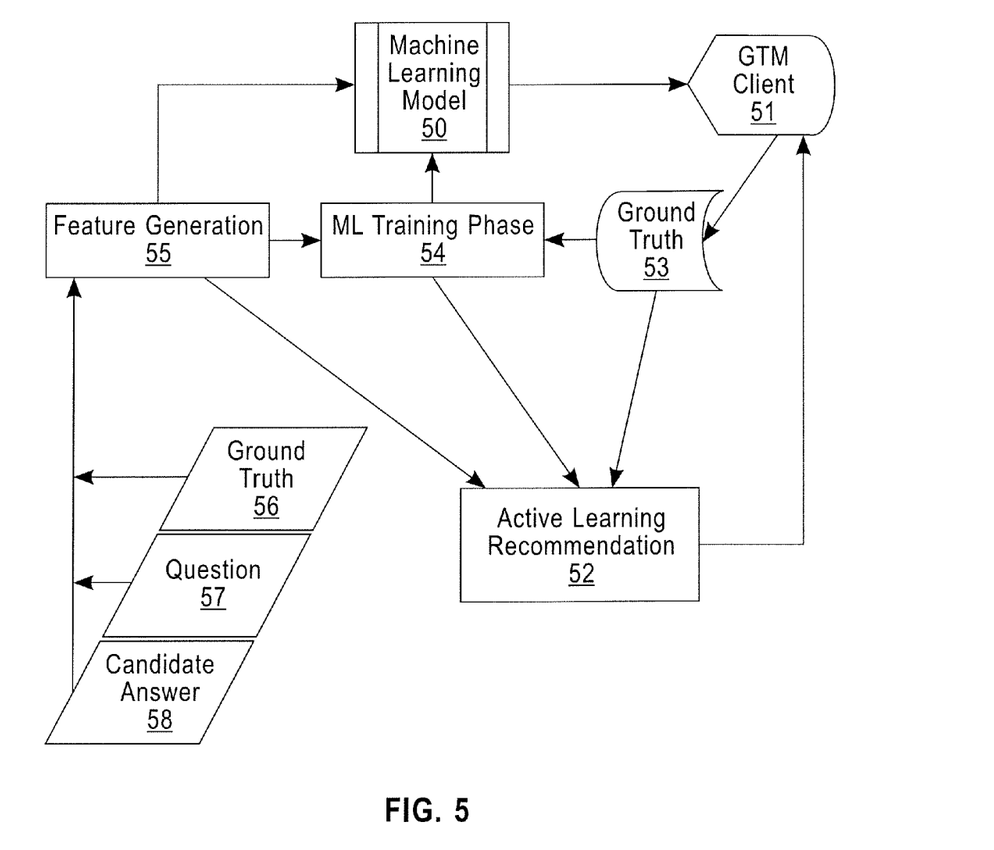
FIG. 5 is a flow chart illustrating an approach for assisted mode machine learning refinement in accordance with exemplary embodiments of the present invention.

FIG. 5 is a flow chart illustrating an approach for assisted mode machine learning refinement in accordance with exemplary embodiments of the present invention. As shown, a machine learning model for candidate answer scoring 50 may be provided. The machine learning model 50 may include one or more trained classifiers that may be trained, for example, during a machine learning training phase 54, as described above. The machine learning model 50 may also utilize one or more features for quantifying the relationship and similarity among candidate answers, questions, and ground truths. These features may be provided to the machine learning model during a feature generation step 55. The features so-generated may be used by the machine learning model 50 to quantify the aforementioned relationships using various natural language processing techniques, including but not limited to n-gram matching, synonym expansion, number recognition, named entity recognition, date/time recognition, entropy/inversed document frequency weighting, etc.

The machine learning model 50 may receive a set of candidate answers form the question answering classifiers (not shown) and may generate a score for each candidate answer based on the trained candidate answer scoring classifiers thereof and the generated features 55. The candidate answers and their associated scores may be provided to a ground truth matching (GTM) client user interface (UI) 51.

The machine learning model 50 may, in the training phase thereof 54, take feature vectors generated for each candidate answer as well as a target vector for answer correctness from the ground truth and compute a weight vector through a selection of machine learning models such as logistic regression, SVM, linear regression and etc. When the training is finished, the weight vector computed may be use to rank or classify the incoming candidate answers. In the assisted mode shown, users may label the top ranked candidate answers as either correct or incorrect. Both regression and classification models may be used in this phase. In the unassisted modes described below with reference to FIGS. 6 and 7, classification may be used and may be made multinomial to distinguish different level of correctness. Such unassisted annotation of ground truth may either be stored as the new answer key, as shown and described below with reference to FIG. 6 or the run-time temporary answer key for the final machine learning module to accurate rank top the good candidate answers, as shown and described below with reference to FIG. 7.

The machine learning model 50 may perform feature selection, whereby various techniques such as best subset selection, stepwise regression, and regularization (e.g. ridge regression) may be used to determine which of the generated features are used in scoring the candidate answers.

The GTM 51 may present the top-scoring candidate answers to the human annotator and receive annotations such as an indication of whether each of the top-scoring candidate answers is correct or incorrect. The size of the set of top-scoring candidate answers may be determined based on how many candidate answers receive sufficiently high scores or the set may be limited to a predetermined number of candidate answers that are highest-scored. This number may be as few as 5 candidate answers per question, for example. Top-scoring candidate answers that are annotated as correct may be incorporated into the set of ground truths 53.

The GTM 51 user interface may present to the human annotator all of the related artifacts and metadata associated with any question and its candidate answers generated. Using this information, the annotator may import the candidate answer, revise the candidate answer, and/or form a regular expression answer from the candidate answer, for example, using a GTM regex Helper.

The GTM 51 may also receive active learning recommendations from an active learning model 52. The active learning model 52 will recommend to users, via the GTM client 51, whether each candidate answer should be labeled with high priority. The active learning model 52 may be used to extract important features for each candidate answer, rank/classify the candidate answers based on their likelihood of being correct with one or more machine learning models 50, and optionally suggest the most critical candidate answers to be labeled with active learning algorithms.

The active learning model 52 may even recommend to the user which set of questions should be reviewed with high priority. As many of the candidate answers are unlabeled (i.e. unmarked as correct or incorrect), the active learning 52 may find the most valuable unlabeled candidate answers to label first, so that the accuracy of the machine learning model 50 may be enhanced in an accelerating fashion. Thus, the machine learning model 50 and the active learning 52 form a two-step process that may be performed iteratively.

Feature generation 55 may be based on received ground truth data 56, questions 57 and the candidate answers 58. As described above, the step of feature generation 55 may quantify the relationship and similarities among candidate answer, question, and ground truth. This may be performed by analyzing candidate answers to generate a part of feature vectors, analyzing ground truths to generate a part of feature vectors, analyzing questions to generate a part of feature vectors, comparing/analyzing a combination of candidate answers and ground truths to generate a part of feature vectors, comparing/analyzing a combination of candidate answers and questions to generate a part of feature vectors, comparing/ analyzing a combination of a question/ground truth pair with a candidate answer to generate a part of a feature vector, etc.

Figure 6:
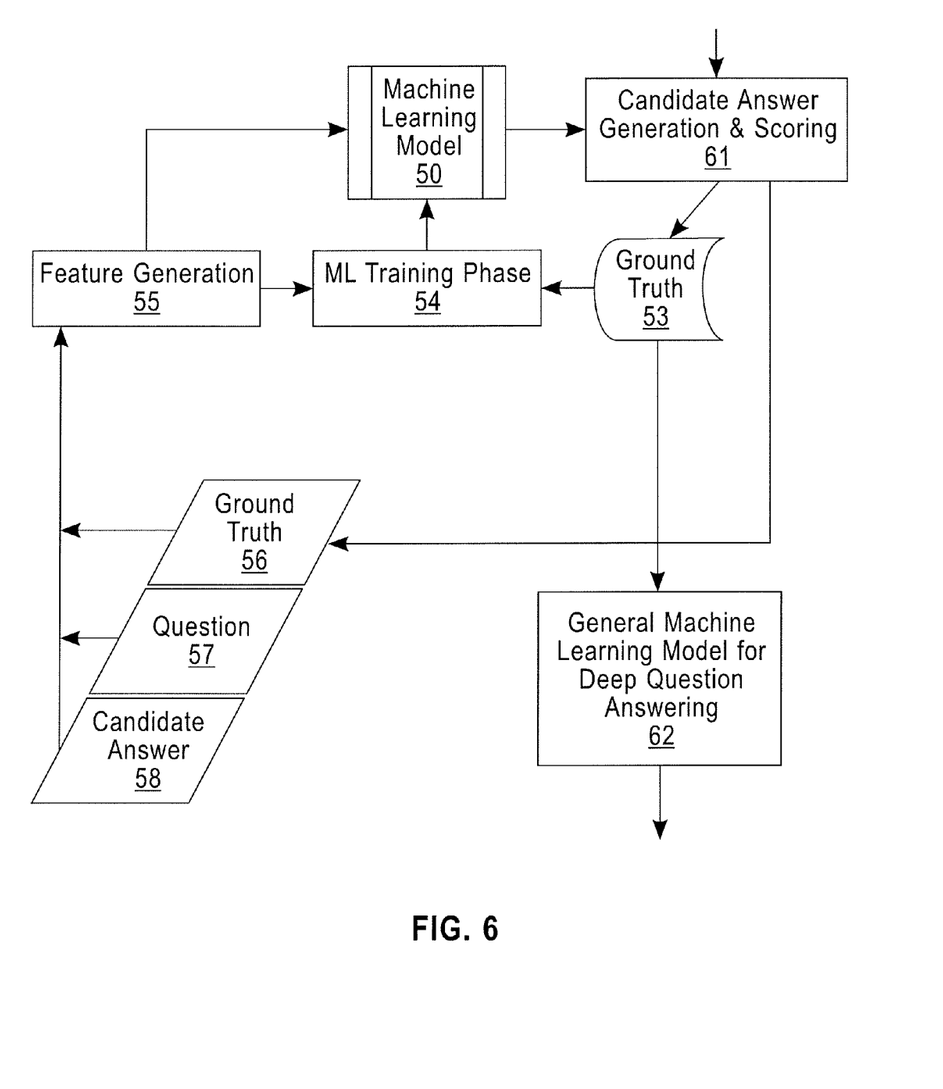
FIG. 6 is a flow chart illustrating a first approach for unassisted mode machine learning refinement in accordance with exemplary embodiments of the present invention.

FIG. 6 is a flow chart illustrating a first approach for unassisted mode machine learning refinement in accordance with exemplary embodiments of the present invention. Like reference numerals may designate similar or identical components to those discussed above with respect to FIG. 5 and accordingly, a description of these components is not repeated.

According to this approach, a human annotator is not involved in the refinement process and accordingly there need not be a GTM client 51. Rather, candidate answer generation and scoring 61 may be performed, for example, using data from the machine learning model 50, and a top-scored subset of the candidate answers may be taken as correct. A bottom-scored subset of the candidate answers may be treated as incorrect, however, this step may be optionally omitted. The candidate answers deemed to be correct may be added to the ground truths 56 used for feature generation as well as the ground truths 53 used for machine learning model 50 training 54. These updated ground truths 53 may also be used to refine the question answering classifiers 62 for use in deep (open domain) question answering.

Figure 7:
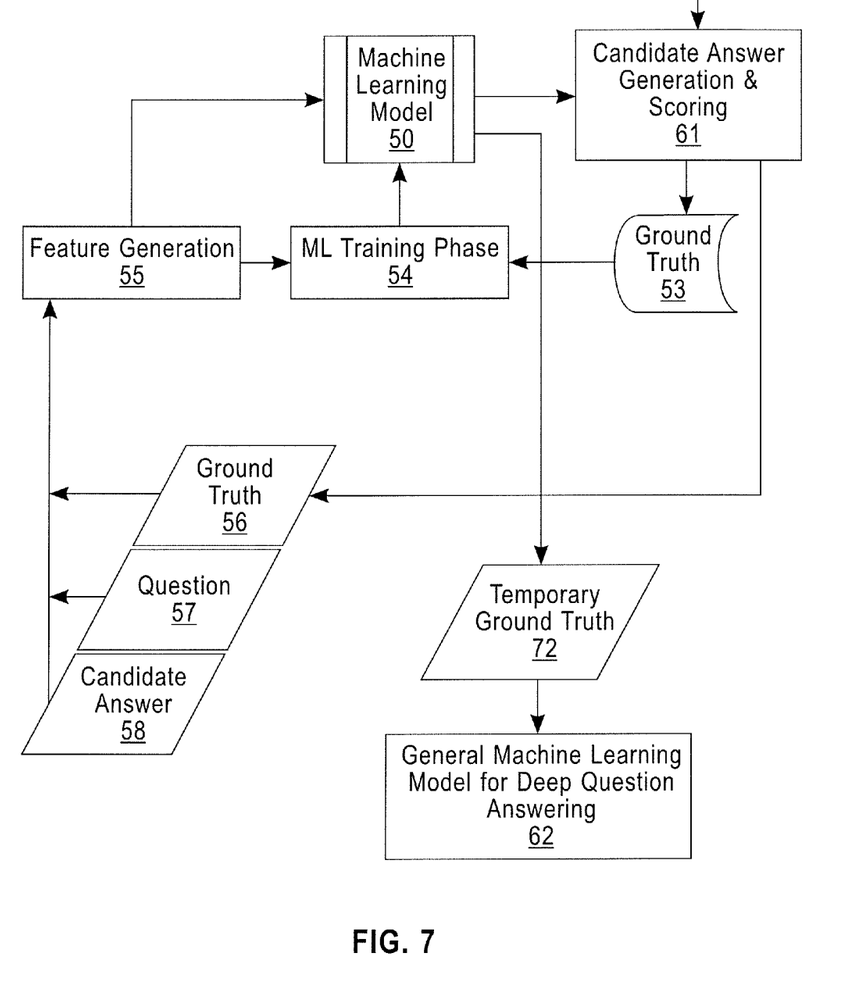
FIG. 7 is a flow chart illustrating a second approach for unassisted mode machine learning refinement in accordance with exemplary embodiments of the present invention.

FIG. 7 is a flow chart illustrating a second approach for unassisted mode machine learning refinement in accordance with exemplary embodiments of the present invention. Like reference numerals may designate similar or identical components to those discussed above with respect to FIGS. 5 and 6 and accordingly, a description of these components is not repeated.

According to this approach, the candidate answer generation and scoring 61 may still update the ground truths 53 and 56 used for machine learning training 54 and feature generation 56, but the machine learning model 50 may establish a set of top-scoring candidate answers as temporary ground truths 72 for the limited purpose of refining the question answering classifiers 62 for use in deep (open domain) question answering.

According to some exemplary embodiments of the present invention, the scoring of the candidate answers may be fine-tuned by creating separate machine learning models for different question classes. Since short answer type questions may be less likely to have the question key words in the answers, exemplary embodiments of the present invention may give less weight to candidate-to-question matching. Likewise, questions with long answers may be more likely to have question key words in the answers and so additional weight may be given to candidate-to-question matching.

Additionally, according to some exemplary embodiments of the present invention, candidate answers may be scored, not only by analyzing the candidate answers themselves, but also by analyzing the evidence from which the candidate answers were generated. This approach may be especially useful for short answer-type questions.

Figure 8:
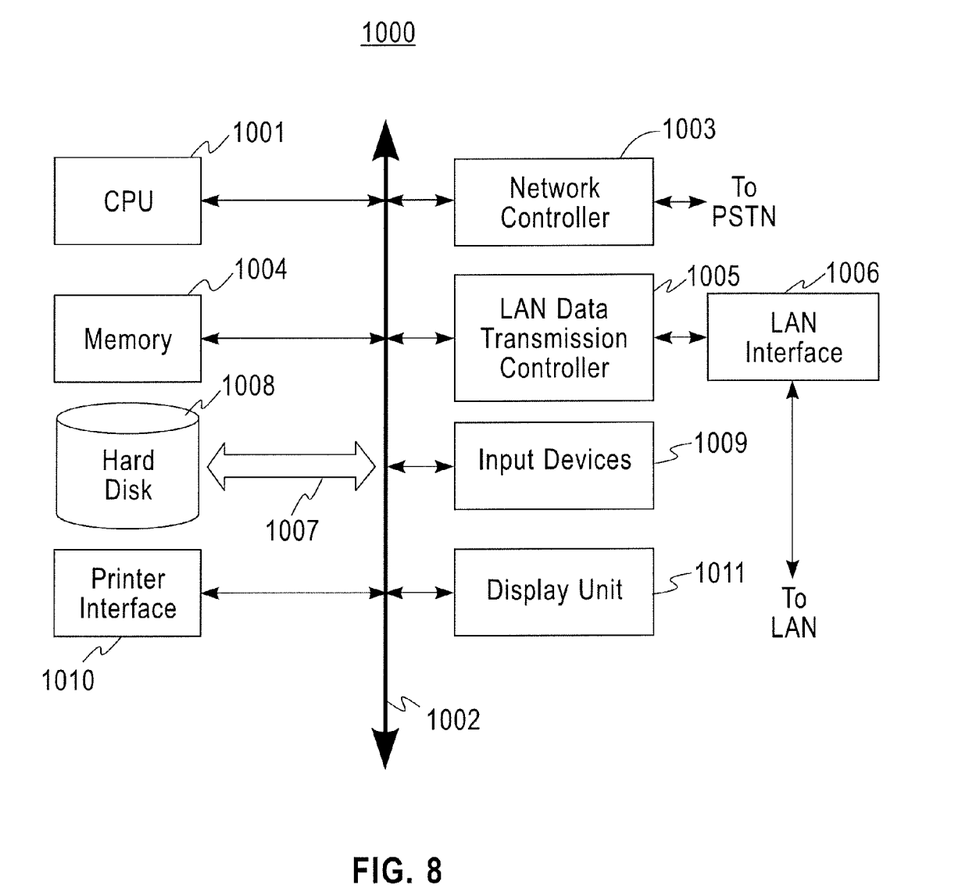
FIG. 8 shows an example of a computer system capable of implementing the method and apparatus according to embodiments of the present disclosure.

FIG. 8 shows an example of a computer system that may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN)

data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for training a machine learning model for open domain question answering, comprising:
    receiving one or more first trained classifiers for question answering;
    using the received one or more first trained classifiers to generate a set of candidate answers to a question;
    using one or more second trained classifiers for scoring each of the candidate answers, wherein the scoring indicates a measure of how well each candidate answer answers the question, and wherein using the second trained classifiers for scoring each of the candidate answers includes comparing each candidate answer to a first ground truth corresponding to the question;
    presenting a set of top-scoring candidate answers to a human operator;
    receiving an indication from the human operator as to whether each presented candidate answer is a correct answer for the question or an incorrect answer for the question;
    treating the candidate answers indicated as correct by the human operator as an additional ground truth for the question; and
    using the additional ground truth for the question to further train the first trained classifiers.

2. The method of claim 1, wherein the received one or more first trained classifiers were trained using machine learning.

3. The method of claim 2, wherein the received one or more first trained classifiers were trained using the question and the first ground truth as training data.

4. The method of claim 1, wherein the question and the first ground truth are provided to the human operator when presenting the set of top-scoring candidate answers.

5. The method of claim 1, wherein the one or more second trained classifiers were trained using machine learning.

6. The method of claim 5, further comprising:
    treating the candidate answers indicated as correct by the human operator as an additional ground truth for the question; and
    using the additional ground truth for the question to further train the second trained classifiers.

7. The method of claim 1, wherein generating the set of candidate answers to the question includes generating features for the candidate answers and the generated features are used by the second trained classifiers in scoring each of the candidate answers.

8. A method for training a machine learning model for open domain question answering, comprising:
    receiving one or more first trained classifiers for question answering;
    using the received one or more first trained classifiers to generate a set of candidate answers to a question;
    using one or more second trained classifiers for scoring each of the candidate answers, wherein the scoring indicates a measure of how well each candidate answer answers the question, and wherein using the second trained classifiers for scoring each of the candidate answers includes comparing each candidate answer to a first ground truth corresponding to the question;
    designating a set of top-scoring candidate answers as a correct answer for the question;
    treating the candidate answers designated as correct as additional ground truths for the question; and
    using the additional ground truths for the question to further train the first trained classifiers.

9. The method of claim 8, wherein the candidate answers designated as correct are only treated as additional ground truths for the question for the purpose of further training the first trained classifiers on one occasion.

10. The method of claim 8, wherein the candidate answers designated as correct are added to a set of ground truths for the question along with the first ground truth for the question so that all subsequent further training of the first trained classifiers make use of the added ground truths.

11. The method of claim 8, wherein the received one or more first trained classifiers were trained using machine learning.

12. The method of claim 11, wherein the received one or more first trained classifiers were trained using the question and the first ground truth as training data.

13. The method of claim 8, wherein the one or more second trained classifiers were trained using machine learning.

14. The method of claim 8, further comprising:
    treating the candidate answers designated as correct as an additional ground truth for the question; and
    using the additional ground truth for the question to further train the second trained classifiers.

15. The method of claim 8, wherein generating the set of candidate answers to the question includes generating features for the candidate answers and the generated features are used by the second trained classifiers in scoring each of the candidate answers.

16. A method for training a machine learning model for open domain question answering, comprising:
    receiving a set of questions and corresponding ground truth answers for each of the questions of the set of questions;
    training a first trained classifiers for question answering by machine learning using the set of questions and corresponding ground truth answers as training data;
    selecting one of the received set of questions and applying the first trained classifier to the selected question to generate a set of candidate answers;
    using one or more second trained classifiers for scoring each of the candidate answers, wherein the scoring indicates a measure of how well each candidate answer answers the selected question, and wherein using the second trained classifiers for scoring each of the candidate answers includes comparing each candidate answer to a first ground truth, of the ground truth answers, that corresponds to the selected question;
    designating a set of candidate answers as correct answers for the selected question based either on score alone or based on human annotations of a set of top-scoring candidate answers;
    treating the candidate answers designated as correct as additional ground truths for the question; and
    using the additional ground truths for the question to further train the first trained classifiers.

17. The method of claim 16, wherein the candidate answers designated as correct are only treated as additional ground truths for the question for the purpose of further training the first trained classifiers on one occasion.

18. The method of claim 16, wherein the candidate answers designated as correct are added to a set of ground truths for the question along with the first ground truth for the question so that all subsequent further training of the first trained classifiers make use of the added ground truths.

19. The method of claim 16, wherein human annotations are obtained by presenting a set of top-scoring candidate answers to a human operator, and receiving an indication from the human operator as to whether each presented candidate answer is a correct answer for the question or an incorrect answer for the question.

20. The method of claim 16, wherein generating the set of candidate answers to the question includes generating features for the candidate answers and the generated features are used by the second trained classifiers in scoring each of the candidate answers.

\* \* \* \* \*